(12) United States Patent
Glunz

(10) Patent No.: US 6,523,169 B1
(45) Date of Patent: Feb. 18, 2003

(54) METHOD FOR TESTING SYSTEM COMPONENTS OF AN OBJECT-ORIENTED PROGRAM

(75) Inventor: Wolfgang Glunz, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/308,739
(22) PCT Filed: Nov. 7, 1997
(86) PCT No.: PCT/DE97/02609
§ 371 (c)(1),
(2), (4) Date: May 24, 1999
(87) PCT Pub. No.: WO98/25204
PCT Pub. Date: Jun. 11, 1998

(30) Foreign Application Priority Data

Dec. 4, 1996 (DE) .......................... 196 50 293

(51) Int. Cl.⁷ .................................. G06F 9/44
(52) U.S. Cl. .................. 717/124; 717/107; 717/108; 717/165; 714/1; 714/25
(58) Field of Search ............. 717/4, 1, 5, 124, 717/126, 107, 105, 109, 108, 165, 166; 707/205, 102; 714/1, 35, 25

(56) References Cited

U.S. PATENT DOCUMENTS

| | | | |
|---|---|---|---|
| 5,345,231 A | | 9/1994 | Koo et al. |
| 5,475,843 A | * | 12/1995 | Halviatti et al. ............ 717/124 |
| 5,615,333 A | * | 3/1997 | Juettner et al. ............ 714/38 |
| 5,724,589 A | * | 3/1998 | Wold ............................. 717/1 |
| 5,751,941 A | * | 5/1998 | Hinds et al. ................ 714/38 |
| 5,892,949 A | * | 4/1999 | Noble .......................... 717/125 |
| 5,907,704 A | * | 5/1999 | Gudmundson et al. ....... 717/1 |
| 5,923,867 A | * | 7/1999 | Hand .......................... 703/14 |
| 5,987,245 A | * | 11/1999 | Gish .......................... 395/680 |
| 6,031,990 A | * | 2/2000 | Sivakumar et al. ......... 717/124 |
| 6,052,691 A | * | 4/2000 | Ardoin et al. ............. 707/102 |
| 6,071,317 A | * | 6/2000 | Nagel ............................ 717/4 |
| 6,085,233 A | * | 7/2000 | Jeffrey et al. ............. 709/216 |
| 6,175,956 B1 | * | 1/2001 | Hicks et al. .................. 717/5 |
| 6,182,117 B1 | * | 1/2001 | Christie et al. ............ 709/205 |
| 6,182,278 B1 | * | 1/2001 | Hamada et al. ............ 717/107 |
| 6,223,306 B1 | * | 4/2001 | Silva et al. .................. 714/37 |
| 6,275,976 B1 | * | 8/2001 | Scandura ...................... 717/1 |
| 6,421,634 B1 | * | 7/2002 | Dearth et al. ................ 703/14 |

FOREIGN PATENT DOCUMENTS

| | | |
|---|---|---|
| DE | 44 16 704 A1 | 11/1995 |
| EP | 0 056 064 | 7/1982 |
| EP | 0 679 004 A2 | 10/1995 |
| WO | WO 94/14117 | 6/1994 |

OTHER PUBLICATIONS

Title: Creating Graphical Interactive Application Objects by Demonstration, author: Myers et al, ACM, 1989.*
Title: Dost: An Environment to Support Automatic Generation of User Interfaces, author: Dewan et al, ACM, 1986.*
8070 Communications of the ACM 37 (1994) Sep. No. 9, New York pp. 59–77.
Obkektorientiert analysieren pp. 80–86.

* cited by examiner

Primary Examiner—Gregory Morse
Assistant Examiner—Chameli C. Das
(74) Attorney, Agent, or Firm—Bell, Boyd & Lloyd LLC

(57) ABSTRACT

A method for testing system components of an object-oriented program, wherein system components of an object-oriented program are tested such that nested dependencies of methods are resolved and an arbitrary method is replaced by a stub (=substitute function). Methods without implementation are thereby discovered and realized as stubs. A test frame generator generates stubs that have the same call and return parameters available to them as the function to be replaced. Further, the substitute function implies an automatic status unit that is, in turn, encapsulated as a class and is instanced in the stub. When the stub is called during the test, the user can interactively use commands that are defined by the encapsulated automatic status unit or combine a plurality of such commands in a command datafile and implement these in automated fashion.

2 Claims, 2 Drawing Sheets

METHOD FOR TESTING SYSTEM COMPONENTS OF AN OBJECT-ORIENTED PROGRAM

BACKGROUND OF THE INVENTION

1. Field of the Invention

The present invention is directed to a method for testing system components of an object-oriented program wherein arbitrary methods are replaced by stubs and a test frame generator generates stubs that have the same call and return parameters available to them as a function being replaced for simplified testing purposes.

2. Description of the Prior Art

Criteria for the comparison of methods, particularly comparative methods of different presentation possibilities of an object-oriented program are explained in W. Archert, "Objektorientiert analysieren—Ein Übeblick der wichtigsten Methoden", Electronik 3/96, pages 80–86. Further, advantages of object-oriented programming are presented, particularly with regard to modularity and portability.

In the development of a software system, it is meaningful to test the individual system components in isolation before the test of the overall system. For example, individual program modules or—given an object-oriented development—classes are system components. The problem often arises in the class or module test that a test unit (class or, respectively, module) is highly dependent on other test units. Such dependencies derive, for example, from the mutual employment of functions (or methods, given the employment of classes). The result thereof, however, is that all other test units U that are used by A (directly or indirectly because, for example, U in turn uses other units) must already be present for the test of a test unit A.

SUMMARY OF THE INVENTION

Accordingly, an object of the present invention is to simplify and speed up the testing of such test units.

In order to avoid this problem, the present invention produces substitute functions with a dummy functionality for the functions and/or methods from other test units U used by the test unit A. Such substitute functions are also called "stubs". Even when a function/method is already implemented, it can be meaningful for the test of other functions/methods to replace this with a stub.

As a result thereof, the complexity of the test frame can be kept low.

The present invention describes the automatic generation of a minimum set of complete substitute functions (stubs) for employment in the class and/or module test. What is thus meant is that all functions/methods that are declared in the software but whose implementation is either not yet present or, on the other hand, cannot be used for complexity reasons are automatically implemented as substitute functions (stubs). Care is thereby exercised that both the return parameter and the handover parameter of the function/method are generated equivalent to the original function/method for the substitute function. A test frame class is locally instanced in the function/method for the implementation of the substitute function. This test frame class encapsulates an automatic status unit that is defined by the parameters (both return handover parameters) of the function that is replaced by the stub. When farther-reaching logical operations are to be implemented within the stub, this can be manually supplemented.

When the software system begins the test run, a branch is made in the stub according to the preset mode of the test frame class. For example, the mode can be that interactive commands corresponding to a command set of an interpreter integrated in the test frame class are allowed at a command prompt or a command datafile that, for example, generates outputs according to the command of the command datafile is implemented in the substitute function. After the interaction or, respectively, the execution of the command datafile, a branch is made from the substitute function back into the calling module. As soon as it is called, a further substitute function makes the same functionality available with the parameters it has. Thus, specific tests can be implemented for all substitute functions with the one test frame class. The encapsulation of the test frame class as a separate automatic status unit enables the flexible employment in every substitute function. The test frame class instanced for the substitute function is initialized with parameters (both handover and return parameters). Type-specific operations that are interactively called or called from a command datafile can be defined, therefore, in the test frame class.

An advantageous development of the inventive method is sound in the interactive employment of the test frame class. This interaction represents a function scope of an integrated debugger with the command set defined in the test frame class. As in a debugger, commands can be interactively implemented on the parameters visible in the current function.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
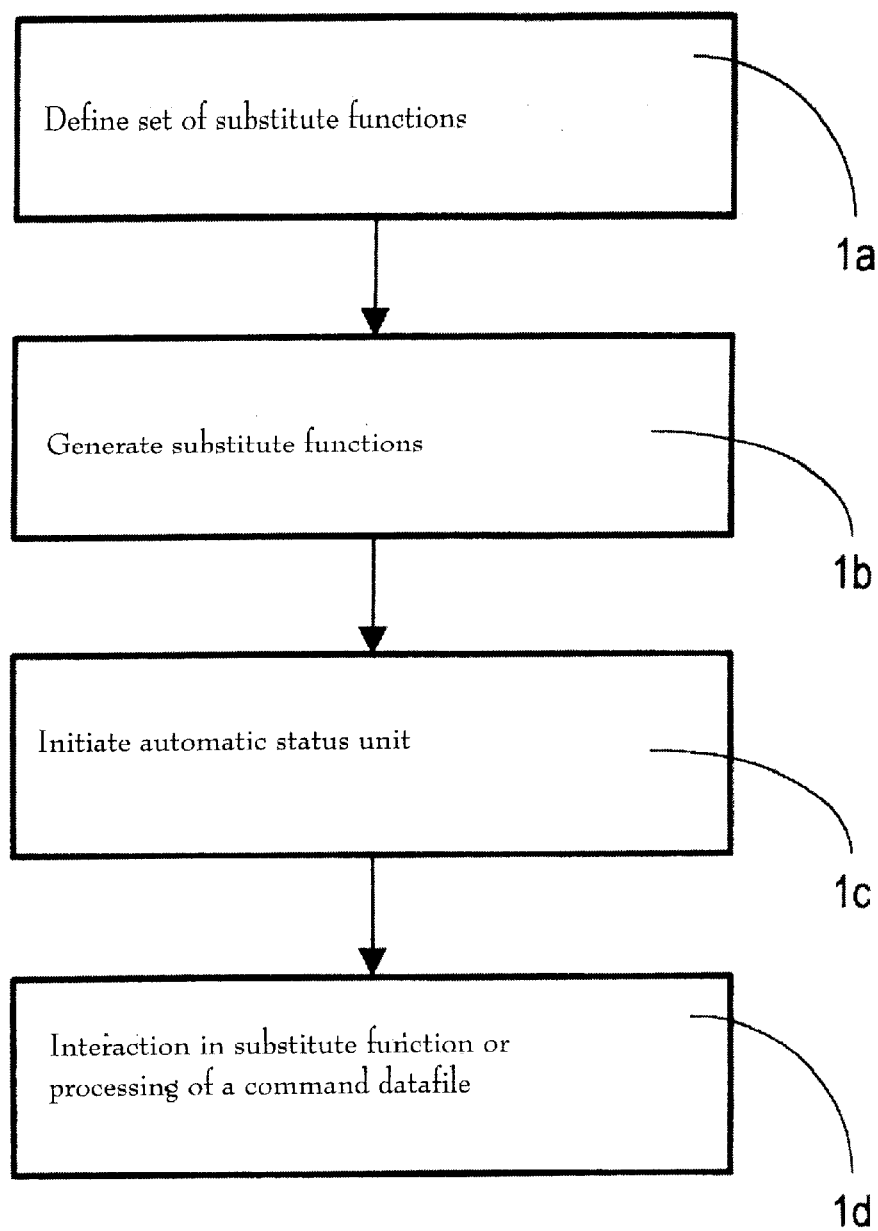
FIG. 1 is a flowchart in which a individual method steps of the present invention are shown.

FIG. 1 shows the individual method steps of the inventive method. The set of substitute functions is defined in a first step 1a. Dependent, for example, on the type of test run, either automatic substitute functions can be created for all methods of an object-oriented program that are not yet implemented or a nesting of method calls can be resolved in that an arbitrarily selected method is implemented as a substitute function in the call hierarchy. A set of substitute functions is thus obtained that is complete insofar as at least all as yet unimplemented functions are represented by substitute functions. The automatic generation of substitute functions takes both the return parameter and the call parameter of the function to be replaced into consideration (see step 1b). In order to obtain the greatest flexibility, a general test frame class can be defined that implements an automatic status unit for each substitute function that, on the one hand, is dependent on the command set of the interpreter integrated in the test frame class and, on the other hand, is defined by the set of parameters of the substitute function or, in case the function is a method of a class, by the class belonging to the method. The test frame class has the same command set available to it for all substitute functions, this allowing access to the parameters (both handover and return parameters) that are specific to the substitute function. Further, the functionality of the substitute function can be supplemented to the effect that the test frame class, after all parameters specific to the substitute function have been defined, can be interactively operated and a command datafile can be processed independently. This corresponds to the initialization of the automatic status unit (step 1c). Interaction thereby means that, as soon as a respective substitute function has been called, the user sees a command prompt during the test run, for example at his picture screen, at which inputs can be made according to the command set predetermined in the test frame class. This procedure also can be automated in that a plurality of such commands allowed by the automatic status unit of the test frame class are combined in a command datafile that is implemented instead of the interaction. It is also possible to arrange implementation of a command datafile and switching into the mode that expects interaction with the user in an arbitrary sequence in a substitute function. Command datafiles, thus, can run exclusively in substitute functions or serve as supplementation between interactions (step 1d).

The method is distinguished in that a new compiling and linking is not required for each test run. Further, test cases can be simply automated in that the aforementioned command datafiles are employed.

An advantageous development of the inventive method is the employment of the test frame class in arbitrary modules. Since all necessary parameters of the test frame class are communicated and since the location for the interaction can be individually defined in the program code, an integrated debugging with view onto the currently valid variables is possible at the location in the program code at which the interaction is allowed. For example, operations on types that contain complex data structures can be implemented fairly simply. The interactively allowed commands can be individually implemented in the test frame class. By encapsulating the functionality for the execution of specific commands in a test frame class, it is possible to offer the functionality of the test frame class for all substitute functions by simple instancing of the test frame class in the respective substitute function.

Figure 2:
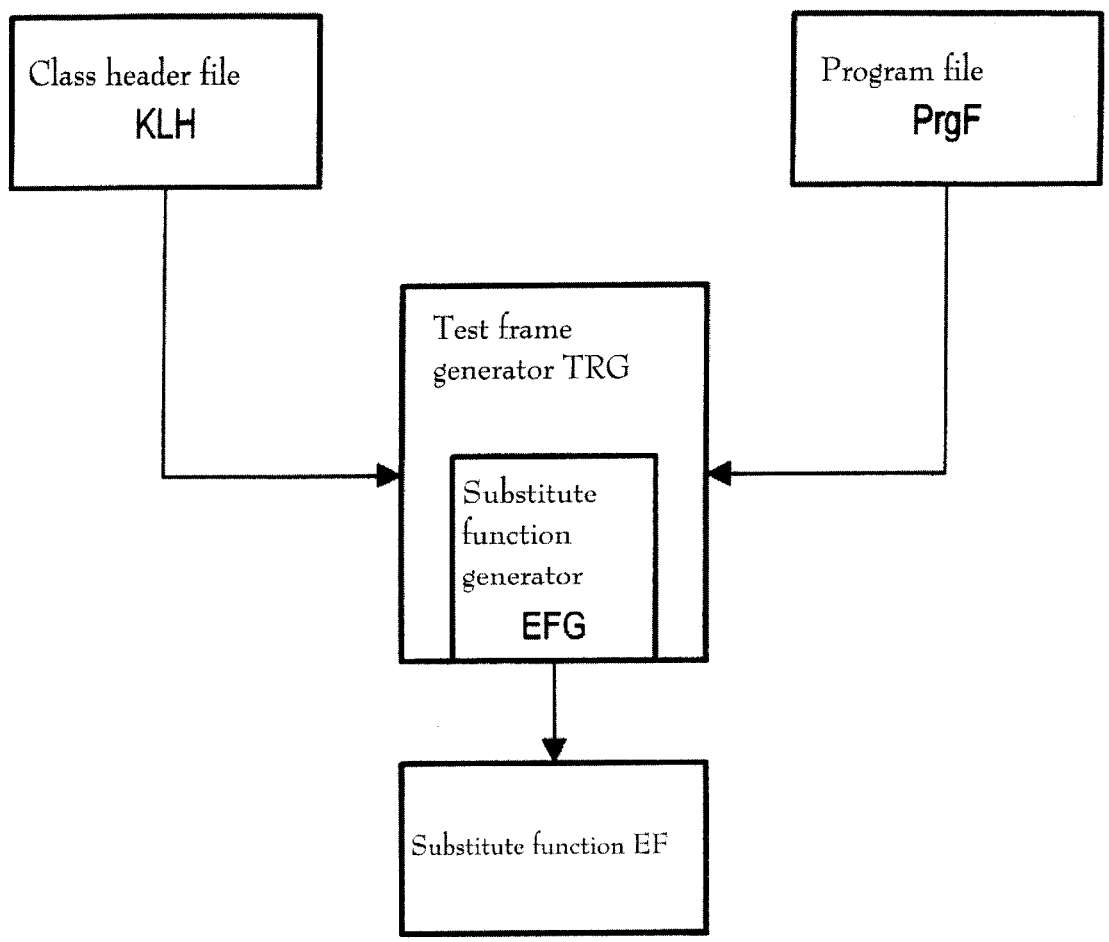
FIG. 2 is a flowchart of an exemplary configuration of the overall method of the present invention.

FIG. 2 shows an exemplary configuration of the inventive method. An object-oriented modelling can be formed for example, using the programming language C++. Expediently, the classes of the system software are declared in corresponding class header files KLH. The methods of the respective classes are implemented in the appertaining program files PrgF (for example, files with the extensions .cpp or .c). When specific methods are declared within the class header files KLH but the appertaining specific implementation is lacking within the program files PrgF, the translator will output an error message that indicates that the implementation of the declared method could not be found (for example, error message "unresolved externals"). From this information about methods whose implementation is either not yet present or, on the other hand, should not be used, a test frame generator TRG generates corresponding substitute functions EF via substitute function generator EFG. To that end, the test frame generator TRG seeks the matching declaration and defines the return and call parameters therefrom. The substitute function EF also receives the same call and return parameters. In order to allow individual test runs within the substitute function EF, a test frame class is instanced in this substitute function. The test frame class has its own methods available to it that allow handover and return parameters of the substitute function EF to be communicated to the instanced test frame class. Further, a mode can be declared within the substitute function EF that, when this substitute function EF is called, allows either interaction at a command prompt or the execution of a command script. When, for example, the interaction mode is selected, the user can input various commands at a command prompt that are declared within the test frame class. This corresponds to a type of interpreter that represents an automatic status unit with the parameters of the substituted function that is defined by the test frame class and has a specific command set available to it.

It is advantageous to simulate functionality inherent in the substituted function in the substitute function EF according to the individual requirements. The encapsulation of the interpreter in its own test frame class, for example in the language C++, has the advantage that the individually defined command set of the automatic status unit declared in the test frame class is available for all instances of this test frame class in every substitute function EF. The only required activity in order to meaningfully use the automatic status unit in the test frame class is the definition of the substitute function-dependent parameters for the automatic status unit. This is automatically implemented by the substitute function generator EFG. A tool that is universal and easy to use for various test instances is obtained that can be used either manually (in the interactive mode) or automatically (with command datafiles) or both.

Although the present invention has been described with reference to specific embodiments, those of skill in the art will recognize that changes may be made thereto without departing from the spirit and scope of the invention as set forth in the hereafter appended claims.

I claim:

1. A method for testing system components of an object-oriented program, wherein the system components include classes and/or modules of the object-oriented program, the method comprising the steps of:

replacing one of a called method and function by a substitute function so as to resolve dependencies of the respective method and function;

representing the substitute function by an automatic status unit, wherein the automatic status unit is encapsulated in a separate class and interactively allows an input of commands; and generating, automatically, the substitute function wherein the substitute function includes the same call parameters and an identical return value as the replaced one of a called method and function.

2. A method as claimed in claim 1, wherein the automatically generated substitute function is used as an integrated debugger and commands are interactively input within the substitute function.

* * * * *